(12) United States Patent
Chang et al.

(10) Patent No.: US 11,057,784 B2
(45) Date of Patent: Jul. 6, 2021

(54) COMMUNICATION SYSTEM WITH ACCELERATED DATA EXCHANGE

(71) Applicant: HONGFUJIN PRECISION ELECTRONICS(TIANJIN)CO., LTD., Tianjin (CN)

(72) Inventors: Yao-Ting Chang, New Taipei (TW); Chao-Ke Wei, New Taipei (TW); Tze-Chern Mao, New Taipei (TW); Li-Wen Chang, New Taipei (TW); Hui-Hsuan Wang, Neihu (TW)

(73) Assignee: HONGFUJIN PRECISION ELECTRONICS(TIANJIN)CO., LTD., Tianjin (CN)

( * ) Notice: Subject to any disclaimer, the term of this patent is extended or adjusted under 35 U.S.C. 154(b) by 142 days.

(21) Appl. No.: 16/508,402

(22) Filed: Jul. 11, 2019

(65) Prior Publication Data
US 2021/0014702 A1  Jan. 14, 2021

(30) Foreign Application Priority Data
Jul. 10, 2019  (CN) .......................... 201910621712.8

(51) Int. Cl.
*H04W 24/02* (2009.01)

(52) U.S. Cl.
CPC .................... *H04W 24/02* (2013.01)

(58) Field of Classification Search
CPC ............................................ H04W 4/30–40
See application file for complete search history.

(56) References Cited

U.S. PATENT DOCUMENTS

| 2012/0134291 | A1 | 5/2012 | Raleigh | |
| 2014/0148154 | A1* | 5/2014 | Sonetaka | H04W 8/005 455/431 |
| 2017/0311216 | A1* | 10/2017 | Mythri Hunukumbure | H04W 8/08 |
| 2019/0268796 | A1* | 8/2019 | Hassan | H04W 28/0226 |
| 2020/0364187 | A1* | 11/2020 | Tran | H04B 7/0413 |
| 2020/0396782 | A1* | 12/2020 | Russell | H04W 36/32 |

FOREIGN PATENT DOCUMENTS

CN        102365630 B    11/2016

* cited by examiner

*Primary Examiner* — Anh Vu H Ly
*Assistant Examiner* — Hector Reyes
(74) *Attorney, Agent, or Firm* — ScienBiziP, P.C.

(57) ABSTRACT

A data communication system able to provide a speedy response to a user equipment transmitting data includes a base station and a data center. The base station is disposed adjacent to the data center, the base station is coupled between the data center and the user equipment, and the base station transmits data provided by the user equipment to the data center. The data center processes first data from the user equipment, and transmits a second data to the user equipment through the base station. Therefore, the data transmission time between the data center and the user equipment is shortened, and the data can be quickly fed back to the user equipment.

12 Claims, 5 Drawing Sheets

COMMUNICATION SYSTEM WITH ACCELERATED DATA EXCHANGE

FIELD

The subject matter herein generally relates to communication systems.

BACKGROUND

A user equipment (UE) can transmit data to a data center through a base station for operation and access, and data of results and calculations can be returned to the user equipment through the base station. It may take a lot of time for the data center to transmit data back and forth through the base station over a long distance, which makes fast responses to the user equipment difficult to achieve.

Therefore, there is a room for improvement.

BRIEF DESCRIPTION OF THE DRAWINGS

Implementations of the present disclosure will now be described, by way of embodiments, with reference to the attached figures.

DETAILED DESCRIPTION

Figure 1:
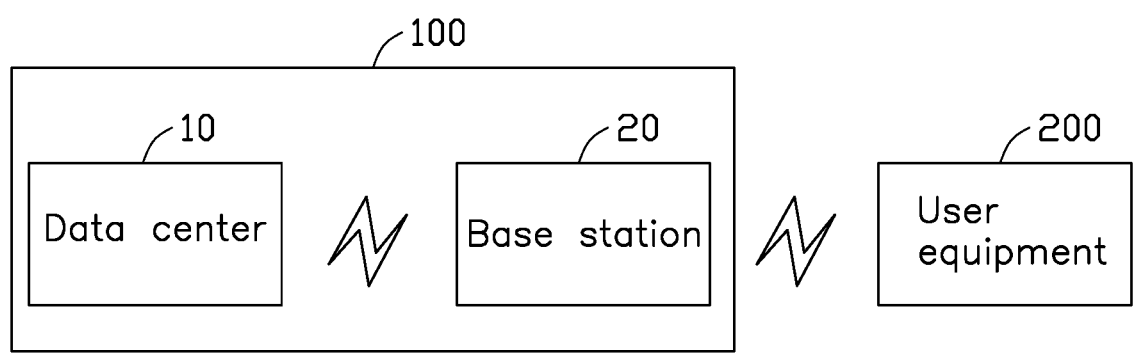
FIG. 1 is a diagram of an embodiment of a communication system for data.

It will be appreciated that for simplicity and clarity of illustration, where appropriate, reference numerals have been repeated among the different figures to indicate corresponding or analogous elements. Additionally, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising" means "including, but not necessarily limited to"; it specifically indicates open-ended inclusion or membership in a so-described combination, group, series, and the like.

FIG. 1 illustrates a data communication system 100 in accordance with an embodiment of the present disclosure. The data communication system 100 is configured to interact with a user equipment (UE 200).

The data communication system 100 includes a data center 10 and a base station 20. In at least one embodiment, the base station 20 is disposed adjacent to the data center 10.

The data center 10 is coupled to the base station 20. In at least one embodiment, the data center 10 and the base station 20 can establish a connection by wireless communication.

The base station 20 is coupled to the UE 200.

In at least one embodiment, the base station 20 and the UE 200 can establish a connection by wireless communication.

In one embodiment, the UE 200 transmits first data to the base station 20.

The base station 20 transmits the first data to the data center 10. The data center 10 processes the first data to obtain a second data, and feeds back the second data to the UE 200 through the base station 20.

Figure 2:
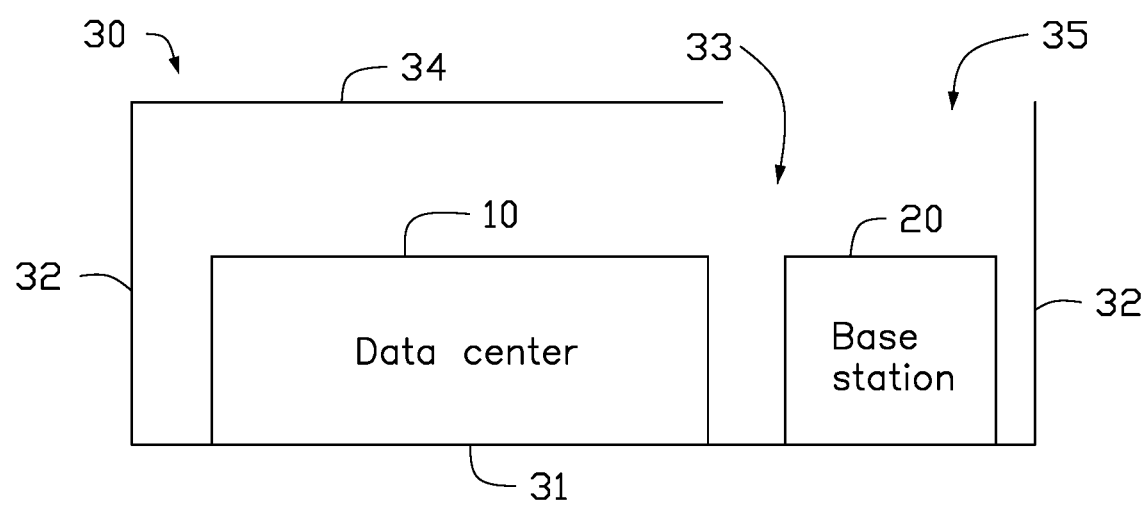
FIG. 2 is a diagram of another embodiment of the system of FIG. 1.

FIG. 2 illustrates that the data communication system 100 further includes a housing 30. In the embodiment, the housing 30 may be a container.

The housing 30 includes a bottom plate 31, two side plates 32, and two end plates (not shown).

The two side plates 32 vertically connect to the sides of the bottom plate 31, the two end plates vertically connect to the ends of the bottom plate 31.

In at least one embodiment, the bottom plate 31, the two side plates 32 and the two end plates together can form a receiving space 33, and both the data center 10 and base station 20 are received in the receiving space 33.

The receiving space 33 further includes a top plate 34, the top plate 34 is vertically connected to the two side plates 32 and the two end plates. In at least one embodiment, the top plate 34 defines an opening 35, and the opening 35 is adjacent to the side plate 32.

The data center 10 is fixedly mounted to one end of the bottom plate 31 away from the opening 35. The base station 20 is fixedly mounted on one end of the bottom plate 31 near the opening 35, and corresponds to the opening 35.

Figure 3:
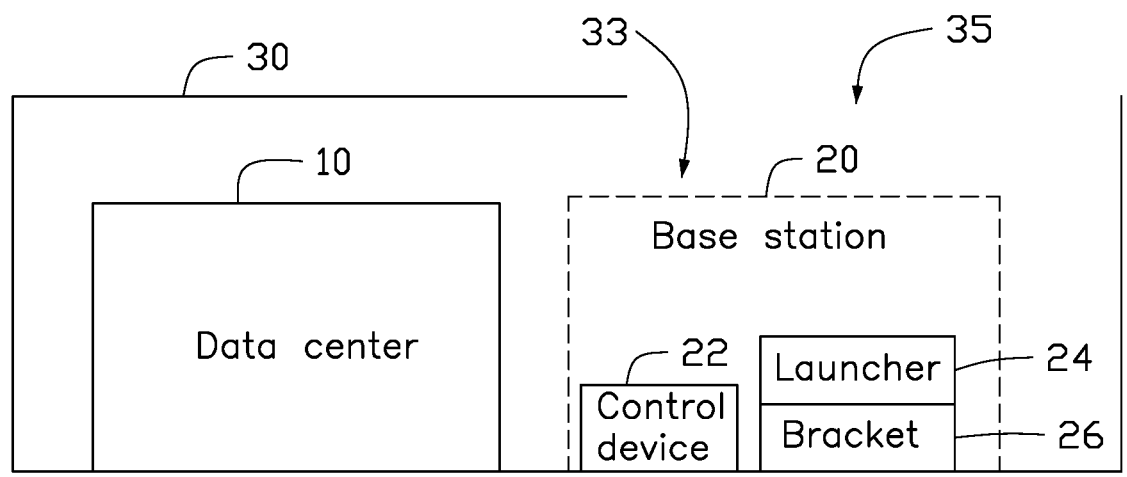
FIG. 3 is a diagram of another embodiment of a communication system for data.

FIG. 3 illustrates that the base station 20 includes a control device 22 and a launcher 24. The control device 22 is fixedly mounted on the bottom plate 31. The launcher 24 is movably disposed on the bottom plate 31 and corresponds to the opening 35.

In the embodiment, the launcher 24 may be a retractable antenna. The control device 22 is coupled to the launcher 24, and the launcher 24 is coupled to the data center 10 and the UE 200 for reception and transmission of signals.

The control device 22 controls the launcher 24 to transmit data between the data center 10 and the UE 200.

For example, when the UE 200 needs to transmit the first data to the data center 10, the user equipment 200 will send a first request signal to the control device 22 through the launcher 24. The control device 22 will control the launcher 24 to receive the first data according to the first request signal, and control the launcher 24 to send the first data to the data center 10.

When the data center 10 needs to transmit the second data to the UE 200, the data center 10 will send a second request signal to the control device 22 through the launcher 24. The control device 22 will control the launcher 24 to receive the second data according to the second request signal, and control the launcher 24 to send the second data to the UE 200.

In the embodiment, the base station 20 further includes a bracket 26. One end of the bracket 26 is fixedly mounted on the bottom plate 31, and other end of the bracket 26 is telescopically connected to the launcher 24.

When the base station 20 is in operation, the bracket 26 can be extended and support the extension of the launcher 24 out of the housing 30 through the opening 35. When the base station 20 is not in operation, the bracket 26 can be retracted and pull the launcher 24 back from the opening 35 into the housing 30.

Therefore, the data communication system 100 installs the data center 10 and the base station 20 in the housing 30, which shortens the time of data transmissions between the base station 20 and the data center 10.

Figure 4:
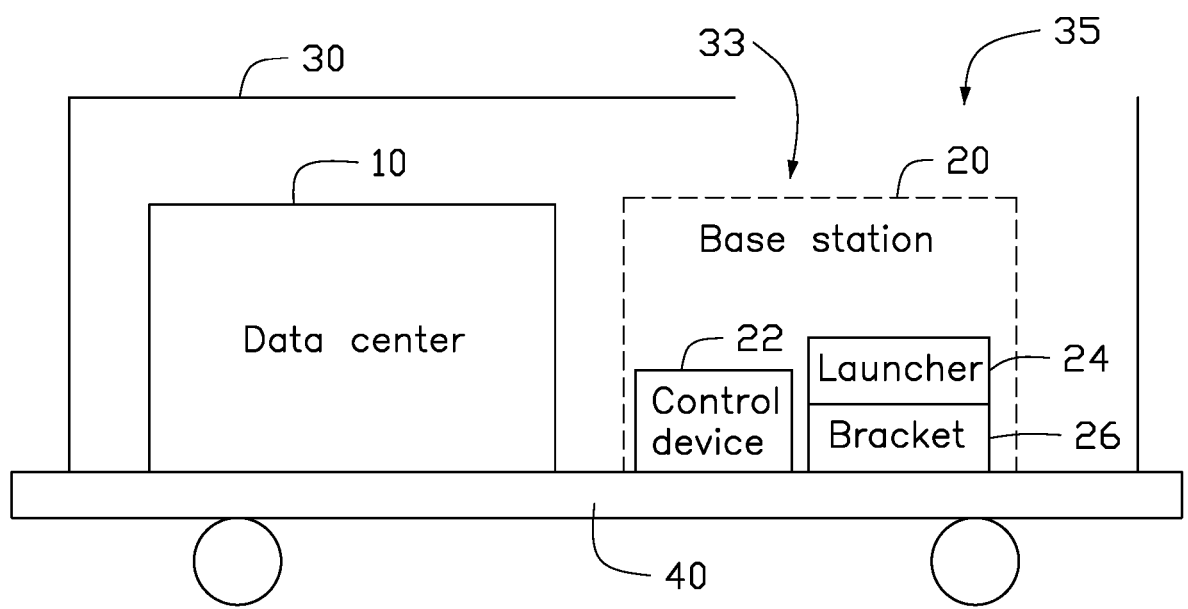
FIG. 4 is a diagram of another embodiment of a communication system for data.

FIG. 4 illustrates a second embodiment of a data communication system 100. The data communication system 100 further includes a driving device 40.

In the embodiment, the housing 30 is fixed mounted on the driving device 40, and the driving device 40 drives the housing 30 to move.

In the embodiment, the driving device 40 may be a trailer.

Therefore, the time of data transmission between the base station 20 and the data center 10 can be shortened, and the flexibility of deployment of the data communication system 100 can also be improved.

Figure 5:
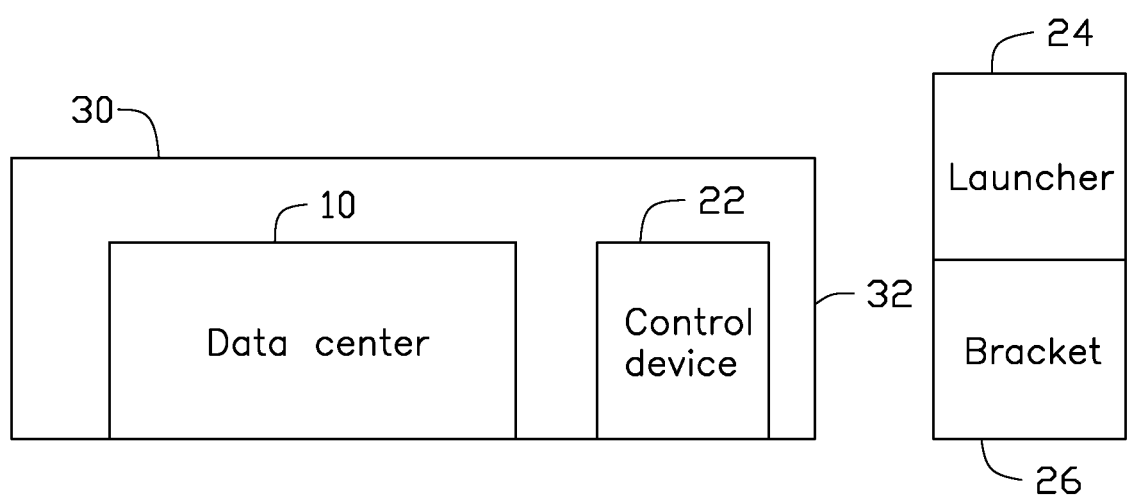
FIG. 5 is a diagram of another embodiment of a communication system for data.

FIG. 5 illustrates a third embodiment of a data communication system 100.

In the embodiment, the data center 10 and the control device 22 are fixedly mounted in the housing 30.

The top plate 34 of the housing 30 is adjacent to the side plate 32 without the opening 35 being formed.

In the embodiment, the bracket 26 is disposed outside the housing 30, and disposed adjacent to the housing 30.

The bracket 26 is fixedly coupled to the launcher 24, and is configured to support the launcher 24.

Therefore, the scale of the base station 20 can be designed according to requirements, thereby improving the working efficiency of the data communication system.

Even though numerous characteristics and advantages of the present technology have been set forth in the foregoing description, together with details of the structure and function of the present disclosure, the disclosure is illustrative only, and changes may be made in the detail, especially in matters of shape, size, and arrangement of the parts within the principles of the present disclosure, up to and including the full extent established by the broad general meaning of the terms used in the claims. It will therefore be appreciated that the exemplary embodiments described above may be modified within the scope of the claims.

What is claimed is:

1. A data communication system configured for interacting with a user equipment (UE), comprising:
   a base station coupling to the UE, and receiving a first data from the UE; and
   a data center coupling to the base station;
   wherein the base station is disposed adjacent to the data center, and the base station transmits the first data to the data center;
   wherein the data center processes the first data to obtain a second data, and feeds back the second data to the user equipment through the base station; and
   wherein the data communication system further comprises a housing and a launcher, the data center and the base station reside in the housing, the housing comprises a top plate, an end of the top plate defines an opening, the data center is disposed away from the opening, and the base station corresponds to the opening, the launcher is movably disposed in the housing, and corresponds to the opening, and the launcher transmits data between the data center and the UE.

2. The data communication system of claim 1, wherein the data communication system further comprises a control device, the control device is fixedly mounted in the housing, the control device is coupled to the launcher, and the control device controls the launcher to transmit the data between the data center and the user equipment.

3. The data communication system of claim 2, wherein the data communication system further comprises a bracket, an end of the bracket is fixedly mounted in the housing, and another end of the bracket is telescopically connected to the launcher.

4. The data communication system of claim 3, wherein when the base station is in operation, the bracket is in an extended state and support the launcher to extend out of the housing through the opening; and when the base station is not in operation, the bracket is in a contracted state and pull the launcher back from the opening into the housing.

5. The data communication system of claim 4, wherein the data communication system further comprises a driving device, the housing is fixedly mounted on the driving device, and the driving device drives the housing to move.

6. The data communication system of claim 5, wherein the housing is a container.

7. A data communication system configured for interacting with a user equipment (UE), comprising:
   a base station coupling to the UE, and receiving a first data from the UE;
   a data center coupling to the base station; and
   the data center and the base station reside in a housing;
   wherein the base station is disposed adjacent to the data center, and the base station transmits the first data to the data center;
   wherein the data center processes the first data to obtain a second data, and feeds back the second data to the UE through the base station; and
   wherein the data communication system further comprises a launcher, the housing comprises a top plate, an end of the top plate defines an opening, the data center is disposed away from the opening, and the base station corresponds to the opening, the launcher is movably disposed in the housing, and corresponds to the opening, and the launcher transmits data between the data center and the UE.

8. The data communication system of claim 7, wherein the data communication system further comprises a control device, the control device is fixedly mounted in the housing, the control device is coupled to the launcher, and the control device controls the launcher to transmit the data between the data center and the UE.

9. The data communication system of claim 8, wherein the data communication system further comprises a bracket, an end of the bracket is fixedly mounted in the housing, and another end of the bracket is telescopically connected to the launcher.

10. The data communication system of claim 9, wherein when the base station is in operation, the bracket is in an extended state and support the launcher to extend out of the housing through the opening; and when the base station is not in operation, the bracket is in a contracted state and pull the launcher back from the opening into the housing.

11. The data communication system of claim 10, wherein the data communication system further comprises a driving device, the housing is fixedly mounted on the driving device, and the driving device drives the housing to move.

12. The data communication system of claim 7, wherein the housing is a container.

* * * * *